United States Patent [19]
Guo et al.

[11] Patent Number: 6,158,274
[45] Date of Patent: Dec. 12, 2000

[54] METHOD OF DETERMINING QUANTITIES DESCRIBING VEHICLE TRAVEL BEHAVIOR

[75] Inventors: Limin Guo, Frankfurt am Main; Ralf Herbst, Nastatten, both of Germany

[73] Assignee: Continental Teves AG & Co. OHG, Germany

[21] Appl. No.: 09/117,310

[22] PCT Filed: Jan. 21, 1997

[86] PCT No.: PCT/EP97/00260

§ 371 Date: Jan. 14, 1999

§ 102(e) Date: Jan. 14, 1999

[87] PCT Pub. No.: WO97/27091

PCT Pub. Date: Jul. 31, 1997

[30] Foreign Application Priority Data

Jan. 21, 1996 [DE] Germany .......................... 196 02 994

[51] Int. Cl.⁷ .................................................. G01M 15/00
[52] U.S. Cl. .......................................................... 73/118.1
[58] Field of Search ................... 73/118.1; 364/426.015, 364/426.016, 426.027, 426.037

[56] References Cited

FOREIGN PATENT DOCUMENTS

| | | |
|---|---|---|
| 387384 | 9/1990 | European Pat. Off. . |
| 392165 | 10/1990 | European Pat. Off. . |
| 3739558 | 6/1989 | Germany . |
| 3919347 | 2/1990 | Germany . |
| 4111614 | 10/1992 | Germany . |
| 4114047 | 11/1992 | Germany . |
| 4121954 | 1/1993 | Germany . |
| 4122484 | 1/1993 | Germany . |
| 4314827 | 5/1993 | Germany . |
| 4140239 | 6/1993 | Germany . |
| 4216301 | 11/1993 | Germany . |
| 4226749 | 2/1994 | Germany . |
| 4436162 | 10/1994 | Germany . |
| 4325413 | 2/1995 | Germany . |
| 4338073 | 5/1995 | Germany . |
| 2283822 | 5/1995 | United Kingdom . |

OTHER PUBLICATIONS

English translation of the International Preliminary Examination Report for PCT/EP97/00260.

Search Report of the German Patent Office Relating to German Patent Application 196 02 994.5.

Japanese Abstract 62–255871 (A) published Jul. 11, 1987.

Primary Examiner—Robert Raevis
Attorney, Agent, or Firm—Rader, Fishman & Grauer PLLC

[57] ABSTRACT

To measure the signal of a yaw rate sensor and/or a transverse accelerometer, the present invention discloses taking into account the rotational speeds of a respectively selected wheel pair for calculating the yaw velocity and/or transverse acceleration of a vehicle. In this respect, the selected wheel pair should comprise one wheel on the left-hand side of the vehicle and one wheel on the right-hand side of the vehicle, and the wheels should not have excessive slip.

7 Claims, No Drawings

METHOD OF DETERMINING QUANTITIES DESCRIBING VEHICLE TRAVEL BEHAVIOR

TECHNICAL FIELD

The present invention relates to a method of determining quantities describing the driving behavior of a four-wheel vehicle.

BACKGROUND OF THE INVENTION

Series vehicles of medium and high price categories are increasingly equipped with systems that enhance active safety in addition to passive safety systems, such as safety belts, airbags, deformation zones, and side-impact protection systems. Active safety systems include, for example, anti-lock systems, systems for traction slip control and, most recently, systems for yaw torque control during cornering. Systems for increasing active safety require, apart from an electronic controller which furnishes specifications for intervention into the brake system, additional components in the vehicle which permit sensing the driving condition, on the one hand, and control intervention, on the other hand. Such vehicle components include, sensors to measure the yaw velocity or the transverse vehicle acceleration render systems which enhance the active safety. Unfortunately these sensors increase vehicle costs. Therefore, an important development aim is to minimize costs for systems of this type. One related objective is, for example, that condition variables which can only be measured by expensive sensors shall be reproduced by signals of less expensive sensors or sensors which are already provided in the system.

German patent application No. 42 16 301 discloses a method that obviates the need for a yaw rate sensor to determine the yaw velocity of a vehicle, i.e., the angular speed about the vertical vehicle axis. Instead of a yaw rate sensor, two axially offset transverse acceleration sensors are mounted into the vehicle. The signals of the sensors provide values for the front and rear transverse accelerations of the vehicle. This renders possible in a simple manner to determine the yaw angle acceleration and the transverse vehicle acceleration without taking a rolling motion into consideration. When the rolling motion of a vehicle during cornering is additionally taken into account, this complicates the entire calculating operation but finally furnishes a result.

An object of the present invention is to provide a method which permits further reducing the sensor means on the vehicle and thereby offers the possibility of reducing the cost for systems used to increase the active safety, especially yaw torque control systems.

Thus, the principle of the present invention is to eliminate even the need for transverse acceleration sensors by evaluating the different wheel rotational speeds of two wheels arranged on each one vehicle side. However, the selection of these wheels shall be bound to defined criteria, and it is important that the selected wheels are not exposed to excessive slip.

Attempts have been made to replace transverse acceleration sensors by evaluating the wheel rotational speeds either on the two front wheels or the two rear wheels. It has been found that the calculating methods employed mirror reality only if both wheels are in a stable driving condition, i.e., have no excessive slip. However, when a pair of wheels is invariably predetermined, it relatively frequently occurs that one of the wheels must undergo slip control. A method of determining driving conditions as mentioned above would provide an only improper operation in such a case.

In the present invention, however, it is possible to take into account two suitable wheels of four different pairs of wheels for evaluating their rotational speeds. This means, the wheel pairs are either the two wheels of the front axle, the two wheels of the rear axle, or the respectively diagonally opposite wheels of the front and rear axles. Even during a slip control operation at least one of the four pairs of wheels mentioned is not concerned by the control. This implies that the reproduction of a yaw velocity and/or a transverse acceleration is successful even in unstable driving conditions when all four wheel rotational speeds offer to select two of them.

However, it should be checked for reasons of safety whether the signals of the wheel sensors are reliable when a defined pair of wheels is selected. When the wheel rotational speeds are used to reproduce the yaw velocity and/or transverse acceleration, it must initially be checked whether an extrapolation of the wheel speeds is being performed, or whether an estimation for calibrating the wheel speeds has not yet been terminated, for example. In the case that the wheel speed can reliably be determined by way of the wheel rotational speeds, the quantities to be reproduced may be calculated by way of the wheel speeds.

Besides, it is imperative to check whether the individual wheel sensors are intact. In the negative, another pair of wheels must be chosen.

When the vehicle is already equipped with an anti-lock system which evaluates the signals of the wheel sensor and tests the operability of the wheel sensors, a defective wheel sensor may best be recognized by the so-called error flags of the anti-lock system.

Should it happen, nevertheless, that there are no two wheels arranged on different vehicle sides which are in a stable driving condition and have intact wheel sensors, the instantaneous wheel rotational speed or wheel speed can be replaced by extrapolation or by rendering constant a previously measured value.

Attached is a table showing the relations of calculation for the yaw velocity - and the transverse acceleration $a_q$ of the vehicle, depending on which pair of wheels was chosen for the calculation of these two quantities. The terms have the following implication:

- yaw velocity
- $a_q$ transverse acceleration
- $v_{vr}$ wheel speed right front wheel
- $v_{vl}$ wheel speed left front wheel
- $v_{hr}$ wheel speed right rear wheel
- $v_{hl}$ wheel speed left rear wheel
- S vehicle tire tread width.

Normally, at least one of the situations listed in the table applies in a calculation cycle so that one pair of wheels can be taken into account for the calculation of the quantities according to the method of the present invention. It may occur, however, that all or at least three wheels are either exposed to slip, or their error flags are set. In this situation, the quantities 'transverse acceleration' and 'yaw velocity' cannot be calculated according to the relation indicated in the table without further effort.

One solution in this event is that the signals adopt the previous value and remain constant in such a cycle. The duration of this situation is normally very short. However, if such a situation has a longer duration, this means, that the vehicle has assumed a highly dynamic behavior (which can not easily be described mathematically) which, with a great likelihood, cannot be removed, not even by yaw torque control by means of brake management.

But it is also possible to extrapolate the instantaneous wheel speed in the absence of a wheel sensor signal by way of the vehicle longitudinal acceleration:

$v_{vr}(i+1) = v_{vr}(i) + a_{fzg}t_o$ $v_{vl}(i+1) = v_{vl}(i) + a_{fzg}t_o$
$v_{hr}(i+1) = v_{hr}(i) + a_{fzg}t_o$
$V_{hl}(i+1) = V_{hl}(i) + a_{fzg}t_o$ In this relation, $v_{xx}$ is the reference speed for wheel xx $a_{fzg}$ is the vehicle longitudinal acceleration $t_o$ is the interval between extrapolation cycles i is the run index of the extrapolation cycles However, in such an extrapolation of the instantaneous wheel rotational speeds, the delayed identification of wheel slip can cause inaccuracy of the initial values. The result is a constant additive error in the calculation of the instantaneous wheel rotational speed. This error cannot be minimized, not even by low-pass filtering.

Matters are different with respect to a delayed identification of wheel slip, provided that at least one pair of wheels can be found which is in a stable driving condition. In this case, only a temporary error will occur which is eliminated in the next calculation cycle. Such errors may also be minimized by using a low-pass filter.

The method of the present invention was tested by way of data from driving tests and compared with methods which produce the yaw velocity or the transverse acceleration by mutual reproduction of the two quantities, or reproduction of these quantities by means of the steering angle on the front wheel, or by the wheel speeds of defined wheel pairs, for example, of the front axle or the rear axle.

In comparison to these other methods, the method of the present invention furnishes substantially better results, especially in the course of yaw torque control operations, because the method of the present invention can also be used in dynamic driving conditions, provided that only at least two wheels are below a determined slip threshold. In stationary driving conditions, the results are initially (at least unfiltered due to the signal noises in the wheel sensors) not as good as the results achieved by the above-mentioned methods which reproduce the yaw velocity and/or transverse acceleration by means of other signals. Signal noises can be removed in a simple manner by low-pass filtering so that the disturbing effect is eliminated.

TABLE

Table for the Reproduction of Signals

| If | then | |
|---|---|---|
| the two front wheels are not subject to excessive slip and their error flags are not set, | Install Equation Editor and double-click here to view equation. | Install Equation Editor and double-click here to view equation. |
| the two rear wheels are not subject to excessive slip and their error flags are not set, | Install Equation Editor and double-click here to view equation. | Install Equation Editor and double-click here to view equation. |
| the right rear wheel and the left front wheel are not subject to excessive slip and their error flags are not set, | Install Equation Editor and double-click here to view equation. | Install Equation Editor and double-click here to view equation. |
| the right front wheel and the left rear wheel are not subject to excessive slip and their error flags are not set, | Install Equation Editor and double-click here to view equation. | Install Equation Editor and double-click here to view equation. |

What is claimed is:

1. Method of determining values describing the driving behavior of a four-wheel vehicle, wherein a calculating device is furnished at least with signals of wheel sensors representative of the speeds of the individual wheels, comprising the step of:

A. determining a vehicle wheel from the left side of the vehicle which has a slip value which does not exceed a threshold value and selecting the wheel speed from that left side determined wheel;

B. determining a vehicle wheel from the right side of the vehicle which has a slip value which does not exceed a threshold value and selecting the wheel speed from that right side determined wheel, calculating at least one of a transverse acceleration and a yaw velocity using said left and right side determined wheel velocity, further including the step of in the case that no two wheels satisfy the selection criteria, extrapolating the missing wheel speed or speeds by way of previously measured wheel speeds.

2. Method as claimed in claim 1, further including the step of monitoring the operability of the wheel sensors and considering the operability of the wheel sensor in steps (A) and (B).

3. Method as claimed in claim 2, wherein the steps of considering the operability of the wheel sensors includes checking error flags which are set by a controller of an anti-lock system when malfunction of a wheel sensor occurs.

4. Method as claimed in claim 1, further including the step of in the case that no two wheels satisfy the selection criteria, assuming the most recent wheel speeds are constant.

5. Method of determining values describing the driving behavior of a four-wheel vehicle, wherein a calculating device is furnished at least with signals of wheel sensors representative of the speeds of the individual wheels, comprising the step of:

A. determining a vehicle wheel from the left side of the vehicle which has a slip value which does not exceed a threshold value and selecting the wheel speed from that left side determined wheel;

B. determining a vehicle wheel from the right side of the vehicle which has a slip value which does not exceed a threshold value and selecting the wheel speed from that right side determined wheel, calculating at least one of a transverse acceleration and a yaw velocity using said left and right side determined wheel velocity, further including the step of in the case that no two wheels satisfy the selection criteria, assuming the most recent wheel speeds are constant.

6. Method as claimed in claim 5, ether including the step of monitoring the operability of the wheel sensors and considering the operability of the wheel sensor in steps (A) and (B).

7. Method as claimed in claim 6, wherein the steps of considering the operability of the wheel sensors includes checking error flags which are set by a controller of an anti-lock system when malfunction of a wheel sensor occurs.

* * * * *

UNITED STATES PATENT AND TRADEMARK OFFICE
CERTIFICATE OF CORRECTION

PATENT NO. : 6,158,274  
DATED : December 12, 2000  
INVENTOR(S) : Limin Guo and Ralf Herbst Page 1 of 1

It is certified that error appears in the above-identified patent and that said Letters Patent is hereby corrected as shown below:

Column 4,
Line 55, change "ether including" to -- further including --.

Signed and Sealed this

Seventh Day of May, 2002

Attest:

Attesting Officer

JAMES E. ROGAN
*Director of the United States Patent and Trademark Office*